No. 649,668. Patented May 15, 1900.
M. T. MINOGUE.
ELASTIC WHEEL.
(Application filed Sept. 23, 1899.)
(No Model.)
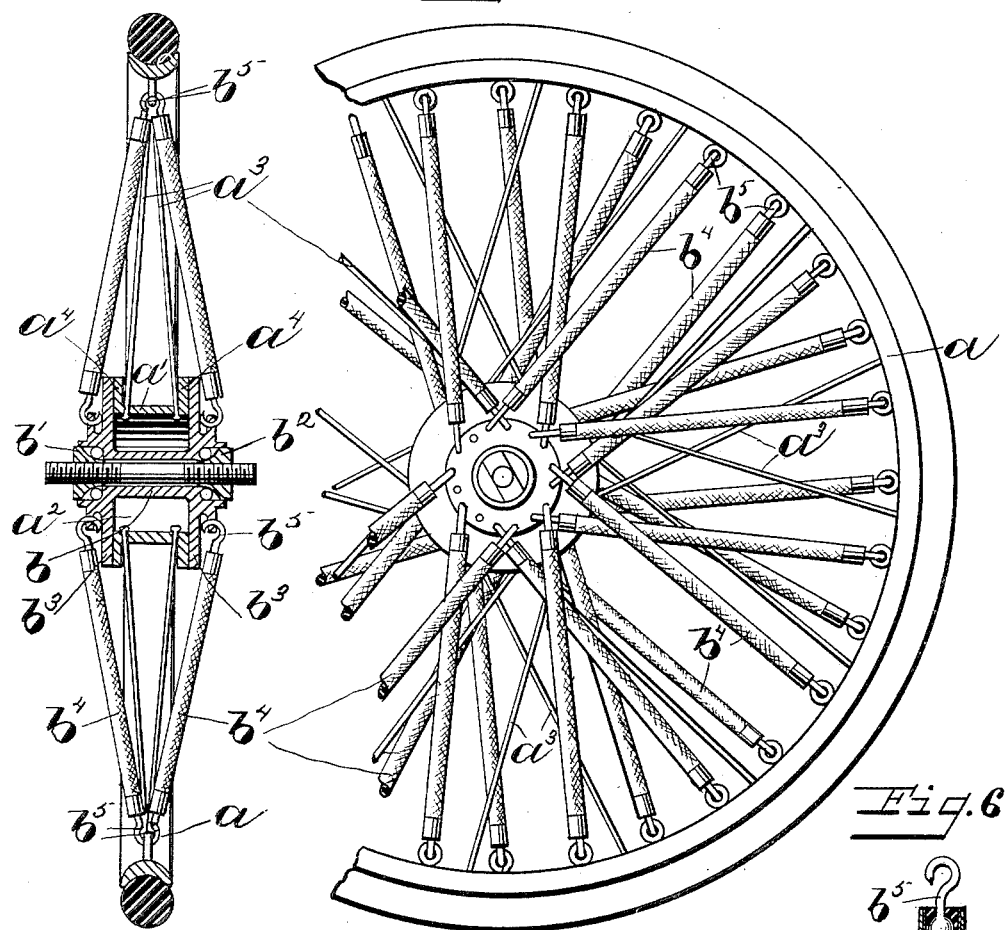
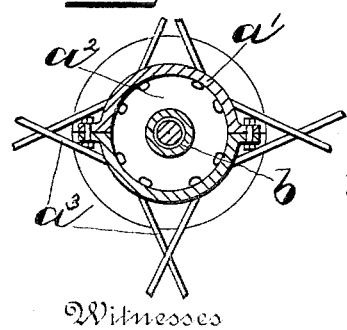
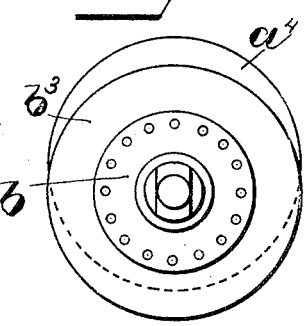

UNITED STATES PATENT OFFICE.

MARTIN T. MINOGUE, OF SPRINGFIELD, OHIO, ASSIGNOR OF ONE-HALF TO THOMAS C. REYNOLDS, OF CINCINNATI, OHIO.

ELASTIC WHEEL.

SPECIFICATION forming part of Letters Patent No. 649,668, dated May 15, 1900.

Application filed September 23, 1899. Serial No. 731,389. (No model.)

*To all whom it may concern:*

Be it known that I, MARTIN T. MINOGUE, a citizen of the United States, residing at Springfield, in the county of Clark and State of Ohio, have invented certain new and useful Improvements in Elastic Wheels, of which the following is a specification.

My invention relates to improvements in elastic wheels; and it especially relates to constructions of wheels adapted for use with bicycles and similar vehicles, although the same constructions may be used with various kinds of vehicle-wheels.

My invention consists in the constructions and combinations of parts hereinafter described, and set forth in the claims.

In the accompanying drawings, Figure 1 is a side elevation of a wheel embodying my invention. Fig. 2 is a sectional view of the same. Fig. 3 is a longitudinal sectional view of the hub, and Fig. 4 is a transverse section of the same. Fig. 5 is a side elevation of the hub, showing the adjustment of the same. Fig. 6 is a detail view of one of the elastic connections or spokes.

Like parts are represented by similar letters of reference in the several views.

In constructing my improved wheel I employ an ordinary felly $a$ and a central hub $a'$, having a large bore or chamber $a^2$. This hub $a'$ is permanently connected to the felly $a$ by means of spokes $a^3$, of wire or other suitable material, in any well-known manner, so that said hub and felly are rigidly connected together. This hub $a'$, which is really in the nature of a sleeve, is preferably provided with flanges $a^4$, which are faced off to make a hub or sleeve of uniform length. The hub proper or that part which supports the axle or trunnion is formed separate and apart from the hub $a'$ and consists of a spool-shaped device $b$, which may be fitted at each end with suitable bearings, as shown at $b'$ $b^2$, and which has extending flanges $b^3$, between which the sleeve $a'$ is fitted. This hub $b$ is connected to the wheel-felly by yielding elastic spokes $b^4$, preferably made of rubber and covered with suitable fabric, which does not impair their elasticity, the ends of each of said spokes being preferably formed with hooks $b^5$, which are molded or otherwise secured in the ends of said elastic spokes and adapted to hook in lugs or eyes formed in the felly and in the hub $b$, respectively. These elastic spokes are under tension at all times, and they are arranged in any suitable manner, preferably tangential in their nature, as shown in Fig. 1, and are adapted to hold the hub $b$ central within the sleeve-hub $a'$ and also central within the wheel-felly. They, however, will under pressure applied to the wheel allow the auxiliary or moving hub to move in its relation to the wheel rim and sleeve $a'$, and thus compensate for unusual weights or jars on said wheel.

In Fig. 4 I have shown the sleeve-hub $a'$ formed in two parts, adapted to be secured together within the flanges $b^3$ of the movable hub, in which case the movable spool-hub could be formed integrally, or, if desired, the constructions may be reversed, as shown in Fig. 3, in which the sleeve-hub is formed integral and the movable or spool hub $b$ is formed in two parts, the inner or central portion of the hub being adapted to telescope. Means may also be provided for adjusting the distance between the flanged ends $b^6$ of said spool-hub by having a screw-threaded nut $b^8$ on one of the telescoping parts to limit and adjust the distance between the said flanges, the central shaft $b^6$ and the adjustable part $b^7$ of the bearing being adapted to prevent the spread of said parts. By this construction means are provided by which the movable hub may be adjusted to the permanent or sleeve hub and take up the wear therein.

It is obvious from the above constructions that I provide a wheel which is held rigidly against any lateral movement, but which is elastic and adapted to readily yield against any undue weight or shock thereon.

Having thus described my invention, I claim—

1. In a vehicle-wheel, the combination with a felly and a permanently-attached sleeve-hub, an auxiliary hub extending through the same and having flanges within which said sleeve-hub is fitted, and elastic connections from said felly to said auxiliary or movable hub and means for adjusting the respective hubs with relation to each other, substantially as described.

2. The combination with the wheel-felly and a sleeve-hub permanently connected thereto by non-yielding spokes, as described, of an auxiliary or movable hub fitted to said stationary hub, and elastic spokes connecting said auxiliary hub to said felly and means for adjusting said hubs with relation to each other, as and for the purpose specified.

3. The combination with the wheel-felly having a central hub or sleeve with projecting flanges and non-yielding spokes connecting said sleeve permanently and centrally to said felly, an auxiliary or movable hub having flanges to embrace the flanges of said stationary hub, and flexible connections from said auxiliary hub to said felly and means for adjusting said auxiliary hub to said central hub, substantially as and for the purpose specified.

4. The combination with the felly having the central hub or sleeve permanently connected thereto by non-elastic spokes as described, an auxiliary or movable hub connected to said felly by elastic spokes, said movable hub having flanges to embrace said stationary hub, and a central rod or shaft extending through said auxiliary hub, said central auxiliary hub being formed in two parts adapted to be held together by said shaft, and an adjusting device for adjusting the ends of said hub to or from each other to cause the same to fit said stationary hub, substantially as specified.

In testimony whereof I have hereunto set my hand this 19th day of September, A. D. 1899.

MARTIN T. MINOGUE.

Witnesses:
FRANK L. WALKER,
BORDER BOWMAN.